US010283083B2

(12) United States Patent
Staudenmaier et al.

(10) Patent No.: US 10,283,083 B2
(45) Date of Patent: May 7, 2019

(54) METHOD AND APPARATUS FOR MANAGING GRAPHICS LAYERS WITHIN A GRAPHICS DISPLAY COMPONENT

(71) Applicant: NXP USA, Inc., Austin, TX (US)

(72) Inventors: Michael Andreas Staudenmaier, Munich (DE); Kshitij Bajaj, Sirsa (IN); Chanpreet Singh, SAS Nagar (IN); Vincent Aubineau, Areches (FR)

(73) Assignee: NXP USA, Inc., Austin, TX (US)

( * ) Notice: Subject to any disclaimer, the term of this patent is extended or adjusted under 35 U.S.C. 154(b) by 49 days.

(21) Appl. No.: 15/590,089

(22) Filed: May 9, 2017

(65) Prior Publication Data

US 2018/0018936 A1    Jan. 18, 2018

(30) Foreign Application Priority Data

Jul. 12, 2016  (EP) .................... 16305882

(51) Int. Cl.
```
G09G 5/00      (2006.01)
G06F 9/451     (2018.01)
G09G 5/02      (2006.01)
G09G 3/20      (2006.01)
G09G 5/377     (2006.01)
G09G 5/36      (2006.01)
```
(52) U.S. Cl.
CPC ............ *G09G 5/026* (2013.01); *G06F 9/451* (2018.02); *G09G 3/2092* (2013.01); *G09G 5/363* (2013.01); *G09G 5/377* (2013.01); *G09G 2320/0276* (2013.01); *G09G 2320/0295* (2013.01); *G09G 2340/10* (2013.01); *G09G 2340/12* (2013.01); *G09G 2352/00* (2013.01); *G09G 2380/10* (2013.01)

(58) Field of Classification Search
CPC ................................. G09G 5/026; G06F 9/451
USPC ........................................................ 345/629
See application file for complete search history.

(56) References Cited

U.S. PATENT DOCUMENTS

| | | | |
|---|---|---|---|
| 6,538,656 B1 * | 3/2003 | Cheung | G06T 9/007 345/519 |
| 8,982,151 B2 | 3/2015 | Tardif et al. | |
| 2011/0157474 A1 | 6/2011 | Nagata | |
| 2015/0100884 A1 | 4/2015 | Ryu et al. | |

(Continued)

FOREIGN PATENT DOCUMENTS

WO    2016087831 A1    6/2016

OTHER PUBLICATIONS

Fujitsu Semiconductor, "Graphics Display Controllers, Product and Technology Overview" May 2012, Fujitsu Semiconductor America, Edition U.S.A. GDC-PB-21389-05/2012, pp. 1-4.*

(Continued)

*Primary Examiner* — Hai Tao Sun

(57) ABSTRACT

A layer selection module for a graphics display component, and method therefor. The layer selection module is arranged to identify a set M of active layers to be blended for a pixel, configure a display controller to generate composite pixel data for the pixel based on a subset N of up to n layers from the set M, determine whether a number m of active layers in the set M exceeds n, and output an indication of which active layers within the set M were excluded from the subset N, if it is determined that the number m of layers in the set M exceeds n.

21 Claims, 4 Drawing Sheets

(56) References Cited

U.S. PATENT DOCUMENTS

2015/0109330 A1* 4/2015 Staudenmaier ......... G06T 11/60
　　　　　　　　　　　　　　　　　　　　　345/629
2017/0329613 A1* 11/2017 Croxford ............... G09G 5/377

OTHER PUBLICATIONS

TES Electronic Solutions GmbH, "CDC-200/300 Customizable Display Controllers," Nov. 19, 2015, 6 pages.
Fujitsu, "Display Controller Block in Fujitsu's GDCs: Salient Features," http://www.fujitsu.com/downloads/MICRO/fma/pdf/FujitsuGDCs.pdf, Copyright 1995-2017, 17 pages.

* cited by examiner

METHOD AND APPARATUS FOR MANAGING GRAPHICS LAYERS WITHIN A GRAPHICS DISPLAY COMPONENT

CROSS-REFERENCE TO RELATED APPLICATIONS

This application claims the priority under 35 U.S.C. § 119 of European Patent application no. 16305882.9, filed on 12 Jul. 2016, the contents of which are incorporated by reference herein.

FIELD OF THE INVENTION

This invention relates to a method and apparatus for managing graphics layers within a graphics display component, and in particular to a layer selection module and a graphics management component and methods therefor.

BACKGROUND OF THE INVENTION

In embedded integrated circuit applications such as automotive applications, embedded devices include display controllers for infotainment and instrument cluster displays. In order to enable dynamic content creation with minimal CPU (central processing unit) intervention, it is known for such embedded display controllers to read (fetch) image data for individual graphics layers to be displayed directly from memory and blend the image data on-the-fly.

Graphical images displayed by automotive infotainment and instrument cluster displays are typically made up of a plurality of graphics objects/layers that are combined (blended) together to generate a composite image that is displayed to an end user. Accordingly, the embedded display controllers mentioned above fetch pixel data for multiple graphics layers, blend the pixel data for the multiple graphics layers to generate pixel data for the composite image to be displayed, and output the generated composite pixel data to a display device; all on-the-fly, one pixel at a time.

Such embedded display controllers are typically implemented within hardware, and include a memory interface component comprising a plurality of data channels, each data channel arranged to receive pixel data relating to one graphics layer and store the received pixel data within a respective input (First-In-First-Out) buffer. The display controller may then perform functions such as format conversion, blending, gamma correction, etc. on-the-fly to generate composite pixel data to be output to a display device.

A problem encountered by such display controllers is that the number of layers they are capable of handling is limited by, for example, the number of channels available within the interface component, and the number of graphics layers overlapping within a single pixel may exceed the number of layers that the display controller is capable of handling.

Conventionally, the overflow layers beyond the capability of the display controller are ignored by the display controller, with the respective pixel data being left out of the composite pixel data that is displayed. In optimized display systems, the graphics layers are dynamically assigned to ensure the highest priority graphics layers are blended within the composite pixel data. However, any overflow layers will not be included within the composite pixel data, and their information will be 'lost' from the displayed image.

SUMMARY OF THE INVENTION

The present invention provides a layer selection module, a processing system and a method of managing graphics layers within a graphics display component as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

The present invention will now be described with reference to the accompanying drawings. However, it will be appreciated that the present invention is not limited to the specific examples herein described and as illustrated in the accompanying drawings.

Figure 1:
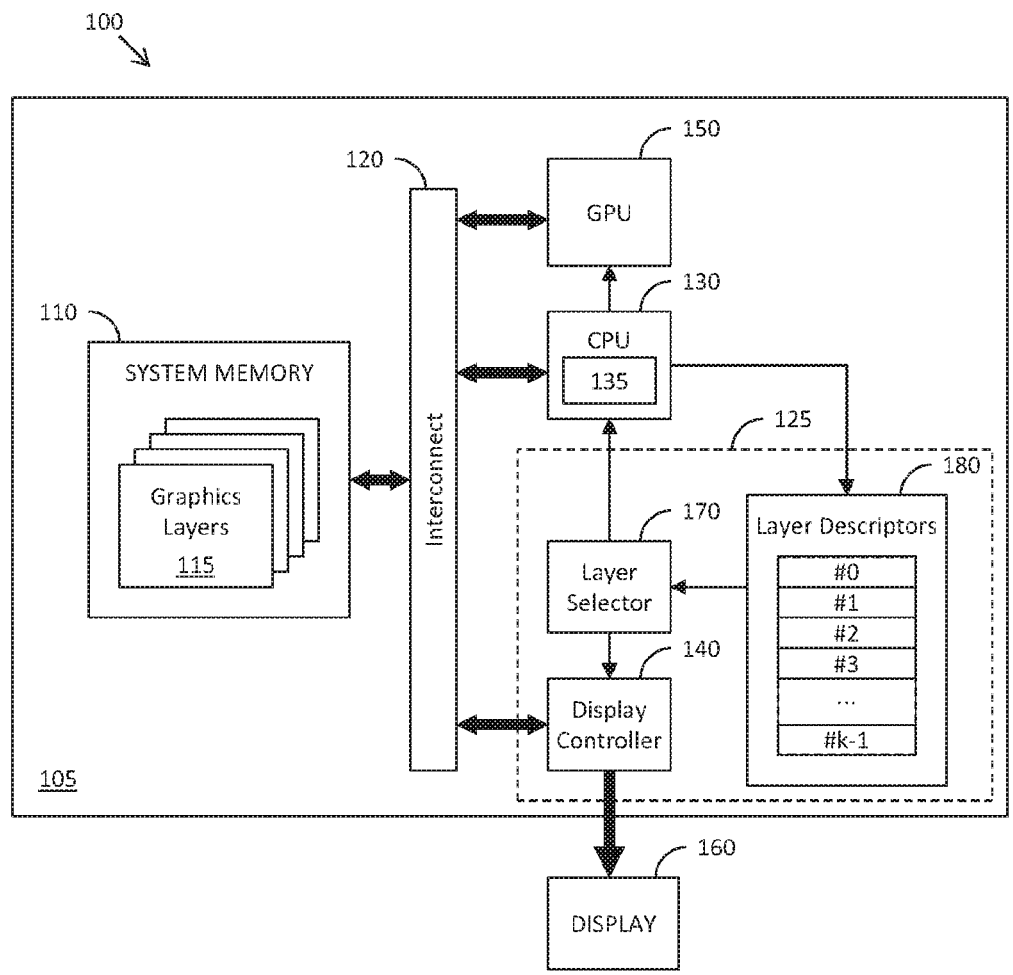
FIG. 1 illustrates a simplified block diagram of an example of processing system.

Referring now to FIG. 1, there is illustrated a simplified block diagram of an example of processing system 100 comprising a graphics display component 125. In some embodiments, the processing system 100 may comprise an embedded processing system, for example for use within an automotive application. For the example illustrated in FIG. 1, the processing system 100 resides within an integrated circuit device 105 and comprises one or more memory elements forming a system memory 110. The system memory 110 may comprise, for example, flash memory, RAM (random access memory), etc. An interconnect component 120 is coupled between the system memory 110 and various system components 130-150, and arranged to enable said system components 130-150 to access the system memory 110, for example to read and/or write data thereto. In the illustrated example, said system components include one or more processing units, such as CPU 130, one or more display controllers 140, and one or more graphics processing units (GPU) 150.

The display controller 140 forms a part of the graphics display component 125 for the processing system 100, and is arranged to fetch pixel data 115 for selected graphics layers stored in memory 110, blend the pixel data 115 for the selected graphics layers to generate composite pixel data to be displayed, and output the generated composite pixel data to a display device 160. The graphics display component 125 for the illustrated example further comprises a layer selection module 170 arranged to receive layer descriptors for the graphics layers 115 stored in memory 110, select the graphics layers 115 to be blended by the display controller 140 for each pixel, and configure the display controller 140 to fetch the selected graphics layers 115 for each pixel. In the illustrated example, the layer descriptors are stored within a descriptor register set 180. However, they may alternatively be stored within an area of system memory 110, or alternatively within some other area of memory such as a dedicated area of memory (not shown).

Figure 2:
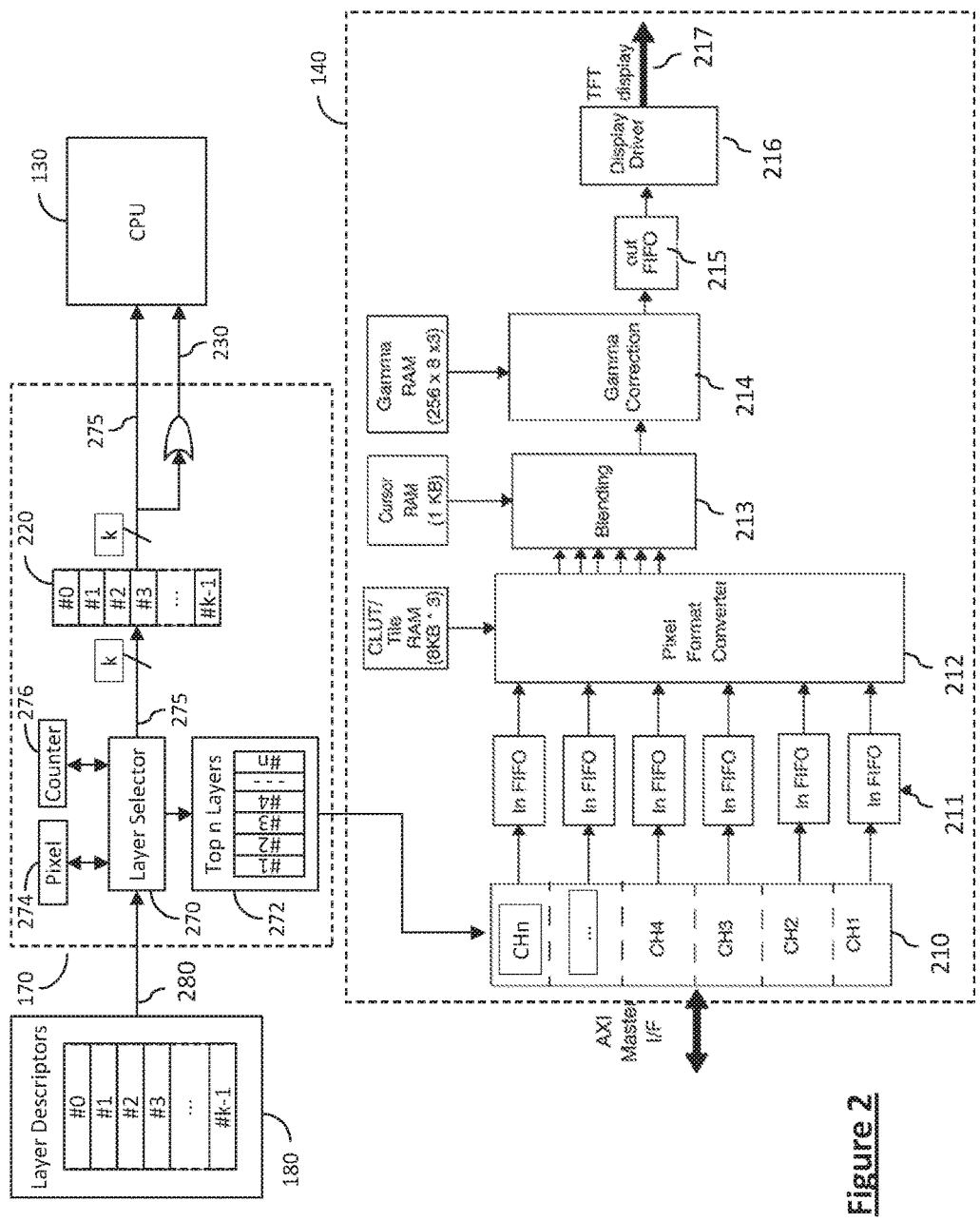
FIG. 2 illustrates an example of a graphics display component.

FIG. 2 illustrates an example of the graphics display component 125 in greater detail. The display controller 140 includes a memory interface component 210 arranged to receive image data 115 from memory 110 (FIG. 1). The memory interface component 210 includes a plurality of data channels (CH1-CHn), each data channel arranged to receive pixel image data 115 relating to one graphics layer. Received pixel image data 115 is stored within input (First-In-First-Out) buffers 211; each data channel of the memory interface component 210 storing received pixel image data 115 within its own input buffer 211. A pixel format converter 212 receives the pixel image data for the individual graphics layers from the input buffers 211, which may be encoded in different formats, and converts the pixel image data into a common format, for example a 32-bit RGBA format, to enable subsequent blending of the layers to be more easily performed. A blender 213 receives the converted pixel data for the individual graphics layers and blends the pixel data to generate composite pixel data to be displayed. A gamma correction component 214 performs gamma correction on the composite pixel data, and outputs the corrected composite pixel data to an output buffer 215. A display driver 216 reads the (gamma corrected) composite pixel data from the output buffer 215, and transmits display data 217 to the display device 160, the display data comprising the composite pixel data read from the output buffer 215.

The memory interface component 210 consists of n (e.g. 6) data channels. In this manner, the display controller 140 is able to generate pixel data for each individual pixel within a composite image to be displayed from a blend of up to n graphics layers. The number of graphics layers that make up the composite image as a whole may be significantly more than the capacity (n) of the display controller 140. As illustrated in FIGS. 1 and 2, the descriptor register set 180 may be able to store descriptors for up to k (e.g. 32) layers for the composite image as a whole. For each pixel, the layer selection module 170 is arranged to select up to n layers from which pixel data is to be blended to generate composite pixel data for the respective pixel, and to configure the memory interface component 210 of the display controller 140 to fetch the relevant pixel data for the selected (up to) n layers.

Due to the adaptable nature of such a graphics display scheme, there is a possibility of the number of active graphics layers (m) overlapping within a single pixel exceeding the number of layers (n) that the display controller 140 is capable of handling. To this end, the layer selection module 170 in the illustrated example is further arranged to identify a set M of active layers for each pixel, configure the display controller 140 to generate composite pixel data for the respective pixel based on a subset N of layers from the set M, determine whether the number m of active layers in the set M exceeds the maximum capacity n of the display controller 140, and output an indication of which active layers within the set M were excluded from the subset N, if it is determined that the number m of active layers in the set M exceeds the maximum capacity n of the display controller 140.

For example, and as illustrated in FIG. 2, the descriptor register set 180 may have stored therein descriptors for a set K of k graphics layers from which the composite image as a whole is to be generated. The layer selection module 170 may comprise a layer selector 270 arranged to receive a layer descriptor 280 for each graphics layer in the set K. The layer selector 270 is then arranged to identify the set M of active layers for each pixel from the set K based on the layer descriptors therefor. For example, each layer descriptor 280 may comprise indications of the position within the image to be displayed of the respective graphics layer, and dimensions therefor. From such information, the layer selector 270 may determine whether the respective graphics layer overlaps a particular pixel, and thus whether the respective graphics layer is 'active' for that pixel. Having identified the set M of active layers for a particular pixel, the layer selector 270 may then select a subset N of up to n active layers from the set M to be blended to generate composite pixel data for the respective pixel. The subset N may be selected based on any suitable criteria. For example, the subset N of active layers may be selected based on a predefined order of the layer descriptors 280 within the descriptor register set 180. In this manner, the priority with which layers are selected for the subset N is determined based on their respective location within the descriptor register set 180. Accordingly, the layer selector 270 may be arranged to sequentially read layer descriptor information 280 from the layer descriptor register set 180 in priority order, and select the first n graphics layers identified as being active for the respective pixel. In the example illustrated in FIG. 2, parameters for each selected active layer may then be stored, for example within selection registers 272. The stored parameters may comprise, for example, address information from where the respective pixel data for the selected layer may be retrieved from memory 110, etc.

Alternatively, the subset N of active layers may be selected based on priority values for the active layers defined within their respective layer descriptors 280, or a combination of such priority values and a predefined order of the layer descriptors 280 within the descriptor register set 180. For example, the layer selector 270 may be arranged to sequentially read layer descriptor information 280 from the layer descriptor register set 180 (optionally in priority order), and for the first n identified active layers store parameters therefor within the selection registers 272, the stored parameters in this example further comprising an indication of the priority value for the respective graphics layer. For subsequently identified active layers, the layer selector 270 may determine a priority value of the respective layer based on priority information within the respective layer descriptor, and to determine whether parameters for a lower priority active layer are stored within one of the selection registers 272. If parameters for a lower priority active layer are stored within one of the selection registers 272, the layer selector 270 may then overwrite the lower priority active layer parameters with parameters for the current, higher priority active layer.

When the subset N of active layers have been selected for a pixel, with parameters for the selected subset N of active layers having been stored within the selection registers 272 in the example illustrated in FIG. 2, the layer selection module 170 is arranged to configure the display controller 140 to generate composite pixel data for said pixel based on the selected subset N of active layers, for example by configuring the memory interface component 210 of the display controller 140 with address information for the selected subset N of active layers etc. stored in the selection registers 272. In this manner, each channel of the memory interface component 210 may be configured to fetch pixel data from an area of memory defined within the layer descriptor for a respective graphics layer within the selected subset N of active layers.

In addition to configuring the display controller 140 to generate composite pixel data based on the selected subset N of active layers, the layer selection module 170 is further arranged to determine whether the number m of active layers in the set M exceeds a display controller configuration limit (i.e. equal to the maximum capacity n of the display controller 140). Notably, if the number m of active layers for a particular pixel exceeds the display controller configuration limit n, pixel data for those active layers not within the selected subset N will not be included within the composite pixel data displayed for the respective pixel, with the pixel information for those active layers being 'lost' from the displayed image. Accordingly, if the number m of active layers in the set M exceeds a display controller configuration limit n, the layer selection module 170 is further arranged to output an indication 275 of which active layers within the set M were excluded from the subset N (hereinafter referred to as 'overflow layers'), for example by setting a bit associated with each overflow layer within an overflow register 220.

Advantageously, by outputting such an indication of overflow layers to a graphics management component, for example an HMI (Human Machine Interface) programme executing on the CPU 130, steps can be taken to determine whether such an overflow situation is acceptable, or whether actions are required to be taken to resolve the overflow situation. For example, and as illustrated in FIG. 2, the CPU 130 may be arranged to receive an interrupt signal 230 when one or more bits are set within the overflow register 220, indicating that at least one overflow layer has been detected by the layer selection module 170 for a pixel within a graphics image being displayed. Upon receipt of the interrupt signal 230, computer program code 135 (FIG. 1) executing on the CPU 130, such as HMI (Human Machine Interface) program code, may be arranged to manage the overflow situation. For example, the computer program code 135 may be arranged to reduce the number k of layers within the set K from which the composite image as a whole is generated to form a reduced set K' of k' graphics layers, where k'<k. In this manner, the likelihood of a subsequent overflow situation occurring for the image being displayed is reduced.

Such a reduction in the number of graphics layers from which the composite image is generate may be achieved by, for example, removing lower priority layers from the image to be generated (e.g. by removing layer descriptors therefor from the descriptor register set 180). In this manner, any information subsequently lost due to the removal of layers may be limited to lower priority layers, ensuring information contained in higher priority layers is maintained within the displayed image.

Alternatively, the computer program code 135 may be arranged to cause some of the layers from which the composite image is to be generated to be pre-blended in advance of the display controller 140, with pixel data for a resulting pre-blended layer being stored in memory 110 and a descriptor for the pre-blended layer being loaded into the descriptor register set 180. In this manner, multiple original layers from the set K may be pre-blended in advance to generate one or more pre-blended layers to be included within the reduced set K'. Such pre-blending of graphics layers may be performed by computer code executing on the CPU 130, or alternatively such pre-blending may be offloaded to a GPU, where available, such as the GPU 150 illustrated in FIG. 1. Advantageously, by pre-blending layers in this manner to reduce the number of layers from which the display controller 140 generates the image to be displayed, the loss of image information from the displayed image may be avoided.

In some example embodiments, the computer program code 135 may be arranged to determine whether the overflow of layers is acceptable (e.g. based on an importance of the graphics objects associated with the overflow layers), and to only resolve the overflow situation (e.g. by reducing the number k of layers within the set K from which the composite image as a whole is generated) if the overflow situation is not acceptable. The importance of a graphics object may depend on any appropriate factors such as, for example, an importance value (e.g. corresponding to the priority value of the corresponding layer) defined for the graphics object, as well as various situational parameters. For example, at night a warning that a vehicles lights are not working properly is more important than during the day. Accordingly, a graphics object used to warn that a vehicle's lights are not working may have a higher importance at night than during the day. Accordingly, the computer program code 135 may determine the importance of a graphics object based on a simple or a complex decision making algorithm, taking into account any number of factors as appropriate.

In the illustrated embodiment, and as described above, the graphics management component to which the indication of overflow layers is output is in the form of computer program code executing on the CPU 130. However, it is contemplated that in some alternative embodiments, such a graphics management component arranged to receive the indication of overflow layers and to take steps to determine whether such an overflow situation is acceptable, or whether actions are required to be taken to resolve the overflow situation, may alternatively be implemented within a standalone component, for example a dedicated hardware component.

Figure 3:
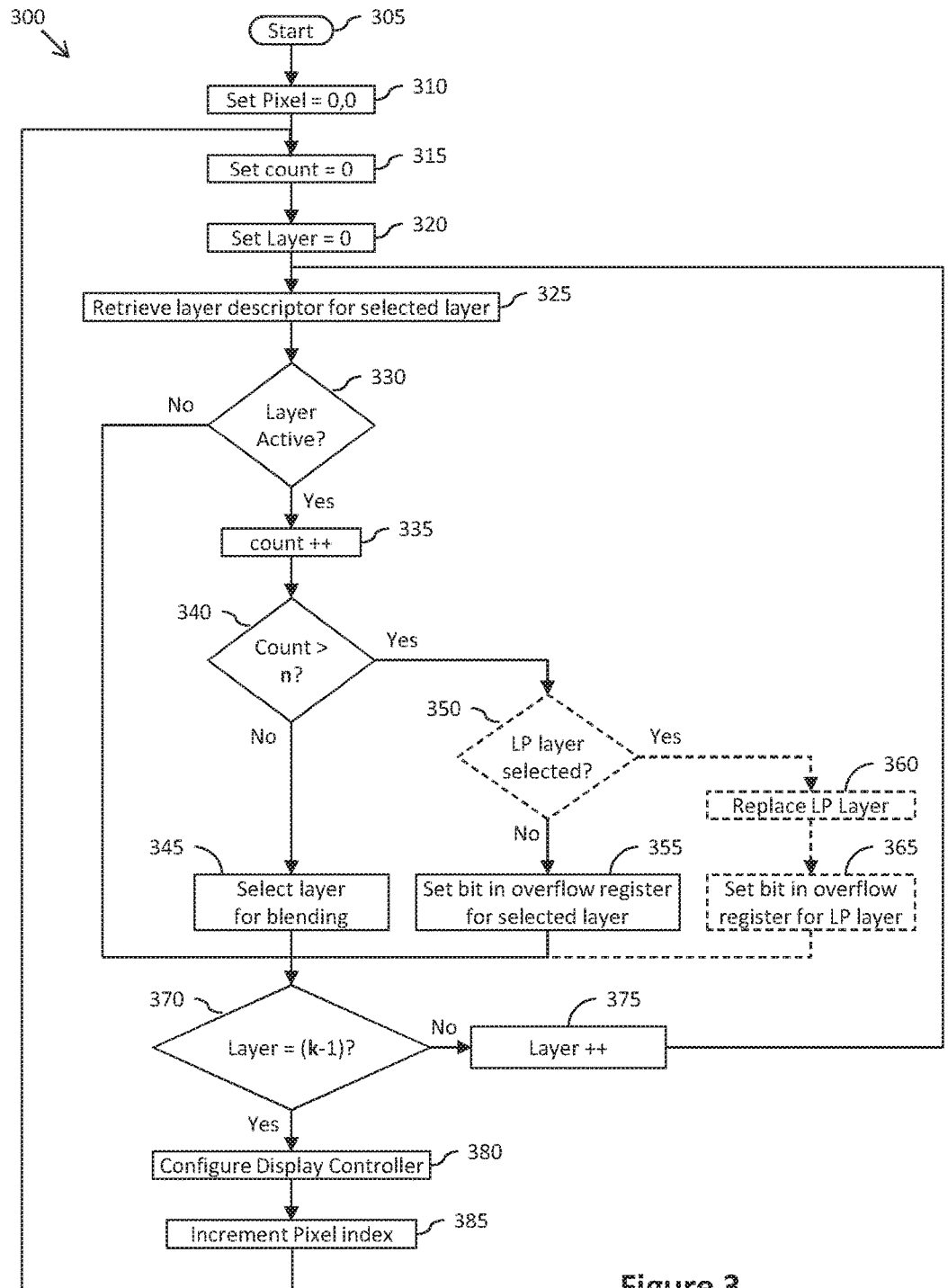
FIGS. 3 and 4 illustrate simplified flowcharts of an example of a method of managing graphics layers within a graphics display component.
Figure 4:
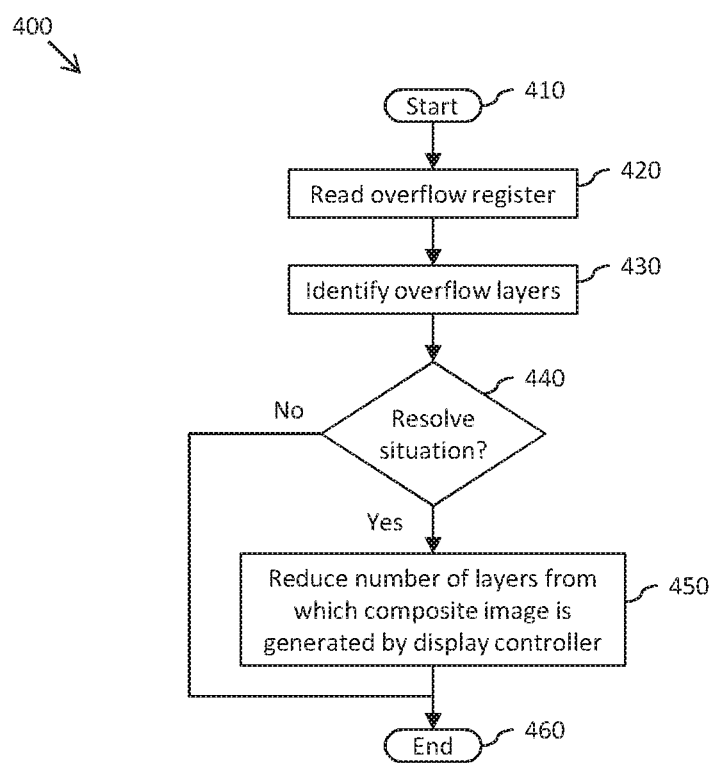

FIGS. 3 and 4 illustrate simplified flowcharts 300, 400 of an example of a method of managing graphics layers within a graphics display component, such as may be implemented within the processing system 100 illustrated in FIGS. 1 and 2.

A first part of the method illustrated in FIG. 3 may be implemented within the layer selector 270 (FIG. 2) of the layer selection component 170. This part of the method starts at 305, and moves on to 310 where a pixel index for an image to be displayed is initialised, such as the pixel index indicated generally at 274. A blend counter, such as the counter 276 illustrated in FIG. 2, is initialised to zero at 315, and a first layer (Layer_0) is set as the current layer at 320. A descriptor for the current layer is retrieved at 325, for example from the corresponding register within descriptor register set 180, and it is determined whether the current layer is an active layer for the current pixel index 274, for example based on indications within the retrieved layer descriptor of the position within the image to be displayed of the respective graphics layer, and dimensions therefor. If it is determined that the current layer is not an active layer for the current pixel index 274, the method jumps down to 370. However, if it is determined that the current layer is an active layer for the current pixel index 274, the method moves on to 335 where the blend counter 276 is incremented, at 355. The value of the blend counter 276 is then compared to the display controller configuration limit n. If the value of the blend counter 276 does not exceed the display controller configuration limit n, the method moves on to 345, where the current layer is selected for blending (i.e. included within the subset N), for example with parameters for the current layer being stored within a selection register 272, before moving on to 370.

Conversely, if the value of the blend counter 276 exceeds the display controller configuration limit n, then in one example embodiment the method moves on to 350 where it is determined whether a lower priority layer has already been selected for blending, for example based on priority information included within the respective descriptors. If none of the layers already selected for blending has a lower priority than the current layer, the method moves on to 355 where, in the illustrated example, a bit corresponding to the current layer is set within the overflow register 220, before moving on to 370. Conversely, if a layer already selected for blending does have a lower priority than the current layer, the method moves on to 360 where the current layer is selected for blending, replacing the lower priority layer at 360 within the subset N of selected active layers. A bit corresponding to the replaced lower priority layer is then set within the overflow register 220, before moving on to 370. In this manner, active layers may be selected based on a combination of priority information within the layer descriptors and the order with which the layer descriptors are retrieved.

In one alternative embodiment, if the value of the blend counter 276 exceeds the display controller configuration limit n at 340, the method may simply move directly to 355, whereby the bit corresponding to the current layer is set within the overflow register 220, before moving on to 370. In this manner, active layers may be selected based solely on the order in which the layer descriptors are retrieved, and thus the priority with which active layers are selected is based on the order in which the layer descriptors are retrieved.

At 370, it is determined whether the current layer is the last layer in the set K. If the current layer is not the last layer, the method moves on to 375 where the next layer is set as the current layer and the method loops back to 325. Conversely, if the current layer is the last layer, the method moves on to 380 where the display controller is configured to generate composite pixel data for the current pixel based on the selected subset N of active layers. The pixel index is then incremented at 385 and the method loops back to 315.

Thus, for the example method(s) illustrated in FIG. 3, the layer selection module 270 is arranged to, for each active layer in the set M for each pixel to be displayed, increment the counter 276, determine whether the counter exceeds n, configure the display controller 140 to generate composite pixel data for the respective pixel based at least partly on the respective layer if the counter is below n, and output an indication (i.e. set a bit in the overflow register 220) that the respective layer has been excluded from the subset n if the counter exceeds n.

A second part of the method illustrated in FIG. 4 may be implemented within a graphics management component, for example within the HMI computer program code 135 executing on the CPU 130. This part of the method starts at 410, for example upon receipt of an interrupt signal 230, and moves on to 420 where in the illustrated example bit values within the overflow register 220 are read. Overflow layers (i.e. active layers within the set M excluded from the subset N) are identified from the overflow register bit values at 430. In the example illustrated in FIG. 4, a determination is then made as to whether the overflow situation requires resolving. For example, it may be determined whether one or more of the identified overflow layers have an importance level higher than a predefined importance threshold. If it is determined that the overflow situation does not require resolving, the part of the method illustrated in FIG. 4 ends, at 460. Conversely, if it is determined that the overflow situation does require resolving, the method moves on to 450 where the number k of graphics layers within the set K from which the composite image as a whole is generated is caused to be reduced to form a reduced set K'. The part of the method illustrated in FIG. 4 then ends, at 460.

In some example embodiments, the assessment of whether a layer overflow occurred may be performed on a VSync (vertical synchronisation) cycle basis. Accordingly, when a layer overflow occurs during a frame being display, the interrupt signal 230 to the CPU 130 will only be triggered, for example, after the frame has been displayed. Alternatively, the assessment of whether a layer overflow occurred may be performed on an HSync (horizontal synchronisation) cycle basis. Accordingly, if a layer overflow occurs during a fame being displayed, the interrupt signal 230 to the CPU 130 will only be triggered, for example, after the respective row of pixels has been displayed. Accordingly, the layer selection module 170 illustrated in FIGS. 1 and 2 may be arranged to generate an interrupt signal 230 when the number m of active layers in the set M exceeds the display controller configuration limit n on a frame (VSync) basis or a row (HSync) basis.

The invention may be implemented at least in part in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a tangible and non-transitory computer readable storage medium or transmitted to the computer system via a computer readable transmission medium. All or some of the computer program may be provided on computer readable media permanently, removably or remotely coupled to an information processing system. The tangible and non-transitory computer readable media may include, for example and without limitation, any number of the following: magnetic storage media including disk and tape storage media; optical storage media such as compact disk media (e.g., CD-ROM, CD-R, etc.) and digital video disk storage media; non-volatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the scope of the invention as set forth in the appended claims and that the claims are not limited to the specific examples described above.

Furthermore, because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Furthermore, the terms 'assert' or 'set' and 'negate' (or 'de-assert' or 'clear') are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Any arrangement of components to achieve the same functionality is effectively 'associated' such that the desired functionality is achieved. Hence, any two components herein combined to achieve a particular functionality can be seen as 'associated with' each other such that the desired functionality is achieved, irrespective of architectures or intermediary components. Likewise, any two components so associated can also be viewed as being 'operably connected,' or 'operably coupled,' to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms 'a' or 'an,' as used herein, are defined as one or more than one. Also, the use of introductory phrases such as 'at least one' and 'one or more' in the claims should not be construed to imply that the introduction of another claim element by the indefinite articles 'a' or 'an' limits any particular claim containing such introduced claim element to inventions containing only one such element, even when the same claim includes the introductory phrases 'one or more' or 'at least one' and indefinite articles such as 'a' or 'an.' The same holds true for the use of definite articles. Unless stated otherwise, terms such as 'first' and 'second' are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A processing system comprising:
   a processing unit;
   a layer selection circuit for a graphics display component, the layer selection circuit being arranged to, for at least one pixel to be displayed:
      identify a set M of active layers for the at least one pixel;
      configure a display controller to generate composite pixel data for the at least one pixel based on a subset N of up to n layers from the set M;
      determine whether a number m of active layers in the set M exceeds n; and
      output to the processing unit an indication of which active layers within the set M were excluded from the subset N, if it is determined that the number m of layers in the set M exceeds n;
   a graphics management circuit of the processing unit arranged to receive the indication that active layers within the set M were excluded from the subset N, and to cause a number k of graphics layers within a set K from which the composite image as a whole is generated to be reduced to form a reduced set K',
   wherein the layer selection circuit is arranged to generate an interrupt signal to a processing unit when the number m of active layers in the set M exceeds the display controller configuration limit n on at least one of a frame basis or a row basis.

2. The layer selection circuit of claim 1, wherein for each active layer within the set M excluded from the subset N, the layer selection module is arranged to set a bit associated with that active layer within a register.

3. The layer selection circuit of claim 1, wherein the layer selection circuit is arranged to receive a layer descriptor for each graphics layer in a set K of graphics layers from which a composite image is to be generated, and to identify the set M of active layers for the at least one pixel from the set K based at least partly on the layer descriptors therefor.

4. The layer selection circuit of claim 3, wherein the layer selection circuit is arranged to select the subset n of layers from the set m of active layers based on at least one of:
a predefined order of layer descriptors; and
priority values defined within the layer descriptors.

5. The layer selection circuit of claim 3, wherein the layer selection circuit is arranged to configure a memory interface component of the display controller to fetch pixel data from an area of memory defined within the respective layer descriptor for each graphics layer within the subset N of active layers.

6. The layer selection circuit of claim 1, wherein the layer selection circuit is arranged to, for each active layer in the set M for each pixel to be displayed:
increment a counter;
determine whether the counter exceeds n;
configure the display controller to generate composite pixel data for the respective pixel based at least partly on the respective layer if the counter is below n; and
output an indication that the respective layer excluded from the subset n if the counter exceeds n.

7. The processing system of claim 1, wherein the graphics management circuit is arranged to cause the number k of graphics layers within the set K to be reduced by removing at least one layer descriptor for at least one lower priority graphics layer within the set K from a descriptor register set to form the reduced set K'.

8. The processing system of claim 1, wherein the graphics management circuit is arranged to cause the number k of graphics layers within the set K to be reduced by causing graphics layers within the set K to be pre-blended in advance of the display controller.

9. The processing system of claim 8, wherein the graphics management circuit is arranged to cause a graphics processing unit to pre-blend a plurality of graphics layers within the set K to generate at least one pre-blended graphics layer to be included within the reduced set K'.

10. The processing system of claim 1, wherein the graphics management circuit is arranged to, upon receipt of the indication that active layers within the set M were excluded from the subset N:
identify the active layers within the set M that were excluded from the subset N;
determine whether a graphics layer overflow situation needs resolving; and
cause the number k of graphics layers within the set K to be reduced, if it is determined that the graphics layer overflow situation needs resolving.

11. A method of managing graphics layers within a graphics display component, the method comprising, within a layer selection module:
identifying a set M of active layers for the at least one pixel;
configuring a display controller to generate composite pixel data for the at least one pixel based on a subset N of up to n layers from the set M;
determining whether a number m of active layers in the set M exceeds n; and
if it is determined that the number m of layers in the set M exceeds n:
outputting to a processor an indication of which active layers within the set M were excluded from the subset N, and;
generating a composite image based on a number k of graphics layers within a set K from which the composite image as a whole is generated to be reduced to form a reduced set K',
generating an interrupt signal to a processing unit when the number m of active layers in the set M exceeds the display controller configuration limit n on at least one of a frame basis or a row basis.

12. The method of claim 11, further comprising receiving in the layer selection module a layer descriptor for each graphics layer in a set K of graphics layers from which a composite image is to be generated, and to identify the set M of active layers for the at least one pixel from the set K based at least partly on the layer descriptors therefor.

13. The method of claim 12 further comprising selecting in the layer selection module the subset n of layers from the set m of active layers based on at least one of:
a predefined order of layer descriptors; and
priority values defined within the layer descriptors.

14. The method of claim 12 further comprising configuring a memory interface component of the display controller to fetch pixel data from an area of memory defined within the respective layer descriptor for each graphics layer within the subset N of active layers.

15. The method of claim 11 further comprising, for each active layer in the set M for each pixel to be displayed:
incrementing a counter;
determining whether the counter exceeds n;
configuring the display controller to generate composite pixel data for the respective pixel based at least partly on the respective layer if the counter is below n; and
outputting an indication that the respective layer excluded from the subset n if the counter exceeds n.

16. The method of claim 11, further comprising causing the number k of graphics layers within the set K to be reduced by removing at least one layer descriptor for at least one lower priority graphics layer within the set K from a descriptor register set to form the reduced set K'.

17. The method of claim 11, further comprising causing the number k of graphics layers within the set K to be reduced by causing graphics layers within the set K to be pre-blended in advance of the display controller.

18. A processing system comprising:
a processing unit;
a layer selection circuit for a graphics display component, the layer selection circuit being arranged to, for at least one pixel to be displayed:
identify a set M of active layers for the at least one pixel;
configure a display controller to generate composite pixel data for the at least one pixel based on a subset N of up to n layers from the set M, wherein n is the maximum capacity of layers of the display controller;
determine whether a number m of active layers in the set M exceeds n; and output to the processing unit an indication of which active layers within the set M were excluded from the subset N, if it is determined that the number m of layers in the set M exceeds n, wherein the active layers within the set M excluded from the subset N are lost such that they are not included in a final displayed image by the display controller;

generate an interrupt signal to a processing unit when the number m of active layers in the set M exceeds the display controller configuration limit n on at least one of a frame basis or a row basis; and a graphics management circuit of the processing unit arranged to receive the indication that active layers within the set M were excluded from the subset N, and to cause a number k of graphics layers within a set K from which the composite image as a whole is generated to be reduced to form a reduced set K'.

19. The layer selection circuit of claim 18, wherein for each active layer within the set M excluded from the subset N, the layer selection module is arranged to set a bit associated with that active layer within a register.

20. The layer selection circuit of claim 18, wherein the layer selection circuit is arranged to, for each active layer in the set M for each pixel to be displayed:
increment a counter;
determine whether the counter exceeds n;
configure the display controller to generate composite pixel data for the respective pixel based at least partly on the respective layer if the counter is below n; and
output an indication that the respective layer excluded from the subset n if the counter exceeds n.

21. The processing system of claim 18, wherein the graphics management circuit is arranged to, upon receipt of the indication that active layers within the set M were excluded from the subset N:
identify the active layers within the set M that were excluded from the subset N;
determine whether a graphics layer overflow situation needs resolving; and
cause the number k of graphics layers within the set K to be reduced, if it is determined that the graphics layer overflow situation needs resolving.

* * * * *